United States Patent [19]

Nagai

[11] Patent Number: 5,668,867
[45] Date of Patent: Sep. 16, 1997

[54] FOLDABLE PORTABLE TELEPHONE WITH IMPROVED ANTENNA GAIN

[75] Inventor: Michio Nagai, Tokyo, Japan

[73] Assignee: NEC Corporation, Tokyo, Japan

[21] Appl. No.: 723,508

[22] Filed: Sep. 30, 1996

Related U.S. Application Data

[63] Continuation of Ser. No. 356,674, Dec. 15, 1994, abandoned.

[30] Foreign Application Priority Data

Dec. 28, 1993 [JP] Japan ................................ 5-335116

[51] Int. Cl.⁶ ........................... H04M 1/00; H04B 1/38
[52] U.S. Cl. ..................... 379/433; 379/428; 379/434; 455/90
[58] Field of Search ............................ 379/433, 434, 379/428, 424, 425; 455/89, 90; 361/814

[56] References Cited

U.S. PATENT DOCUMENTS 5,260,998  11/1993  Takagi .
5,335,368  8/1994  Tamura .................................. 455/90

FOREIGN PATENT DOCUMENTS 0 536 578    4/1993   European Pat. Off. .
  136457     7/1985   Japan ................................ 379/425
4-137948     5/1992   Japan ................................ 379/428
2 254 519   10/1992   United Kingdom .

*Primary Examiner*—Jack K. Chiang
*Attorney, Agent, or Firm*—Young & Thompson

[57] ABSTRACT

A foldable portable telephone is made up of an upper casing having a receiver portion, and a lower casing having a transmitter portion. The lower casing is rotatably connected to the upper casing by a hinge. When the lower casing is rotated away from the upper casing, the receiver portion is moved to protrude from the upper casing. At this instant, the telephone is brought into an off-hook state. When the lower casing is rotated onto the upper casing, the receiver portion is retracted into the upper casing while the telephone is brought into an on-hook state. The receiver portion, when protruded from the upper casing, increases the distance between an antenna and the user's ear. In this condition, the antenna is not influenced by the user's body and, therefore, maintains a sufficient antenna gain.

5 Claims, 6 Drawing Sheets

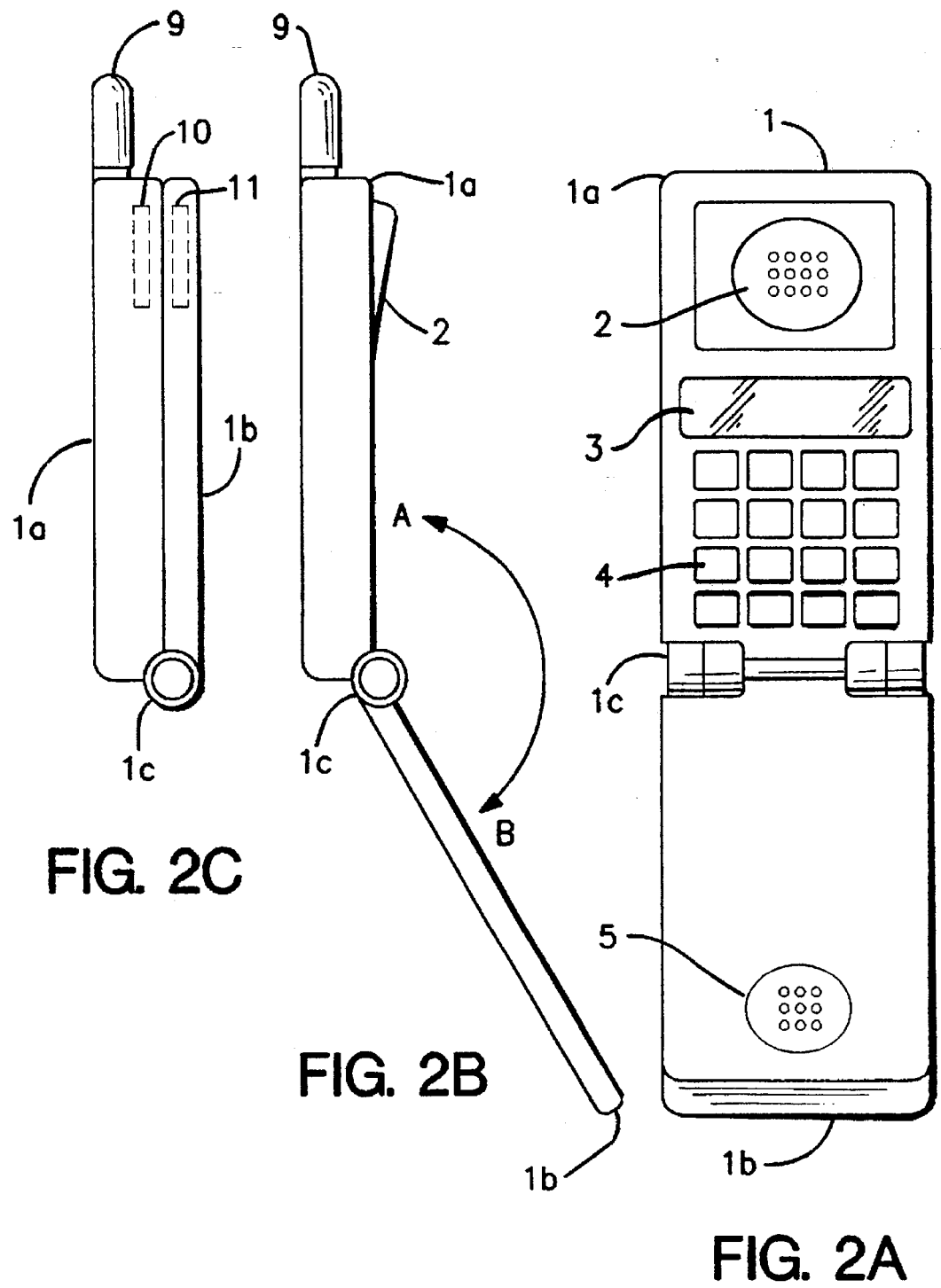

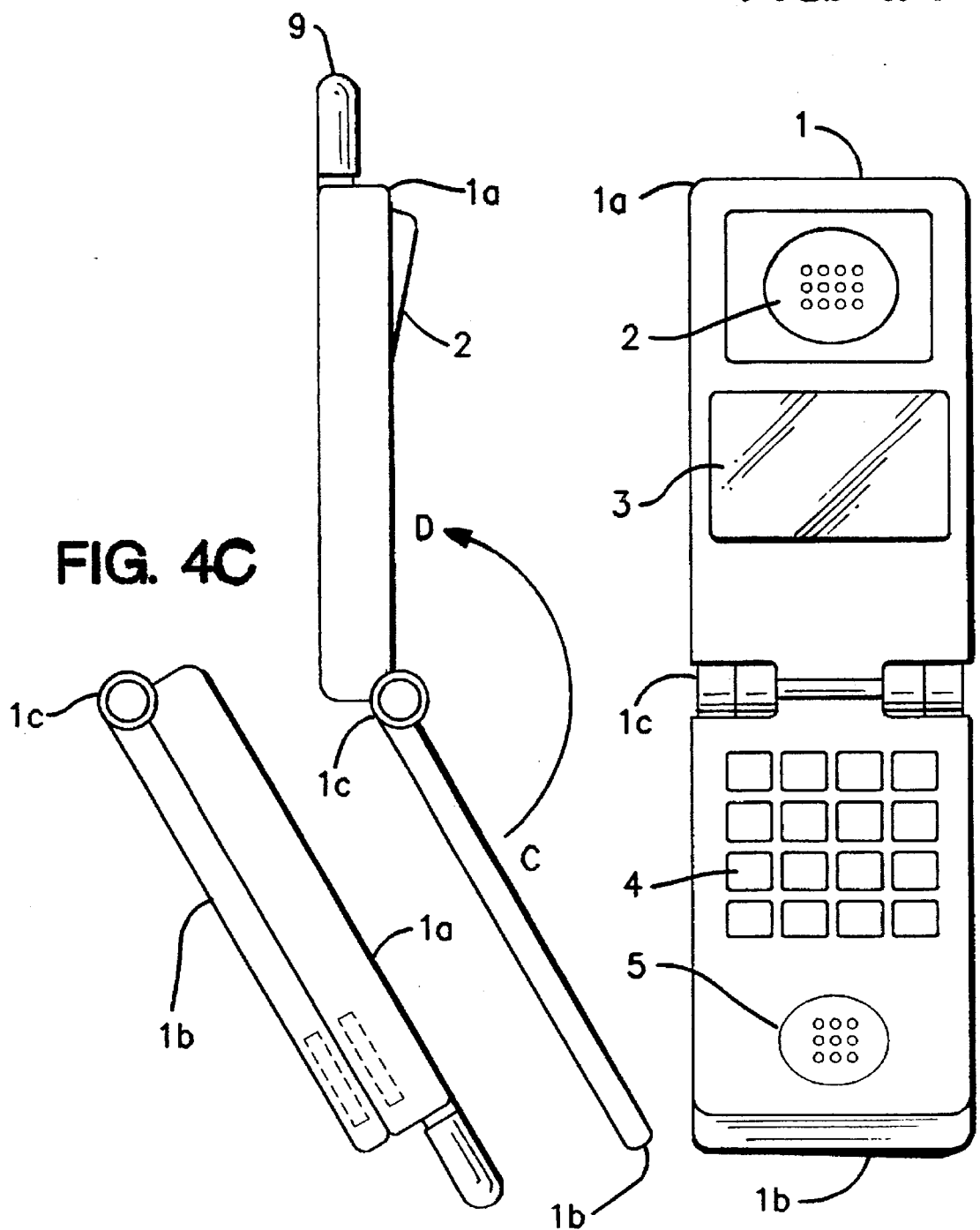

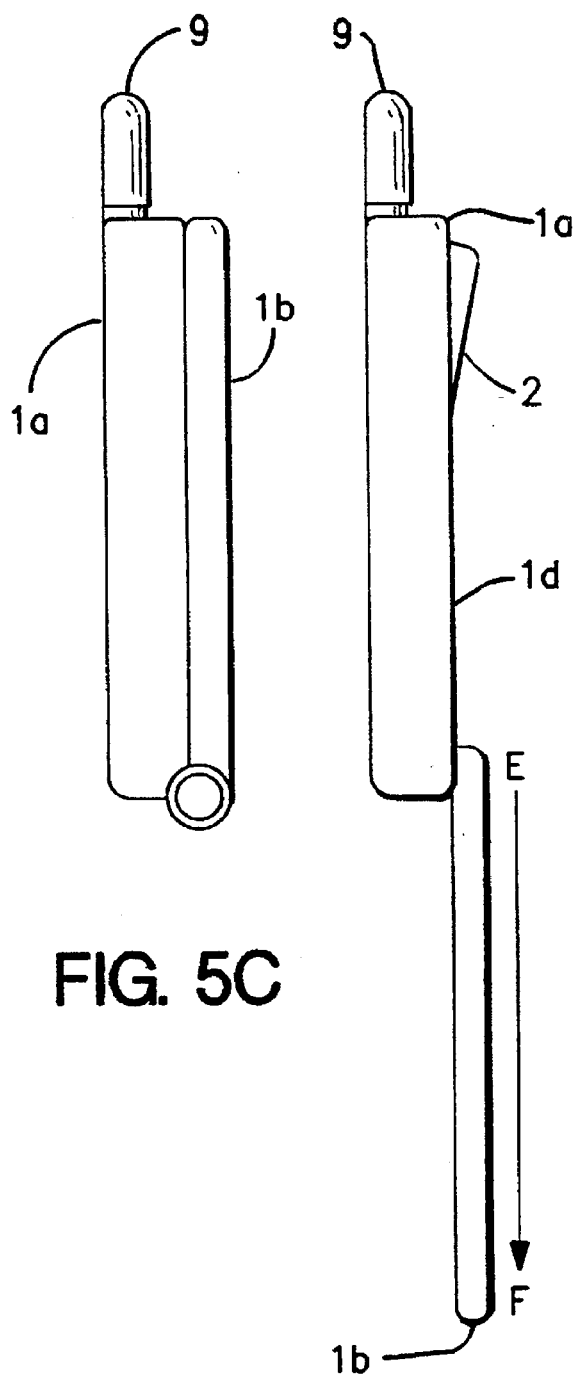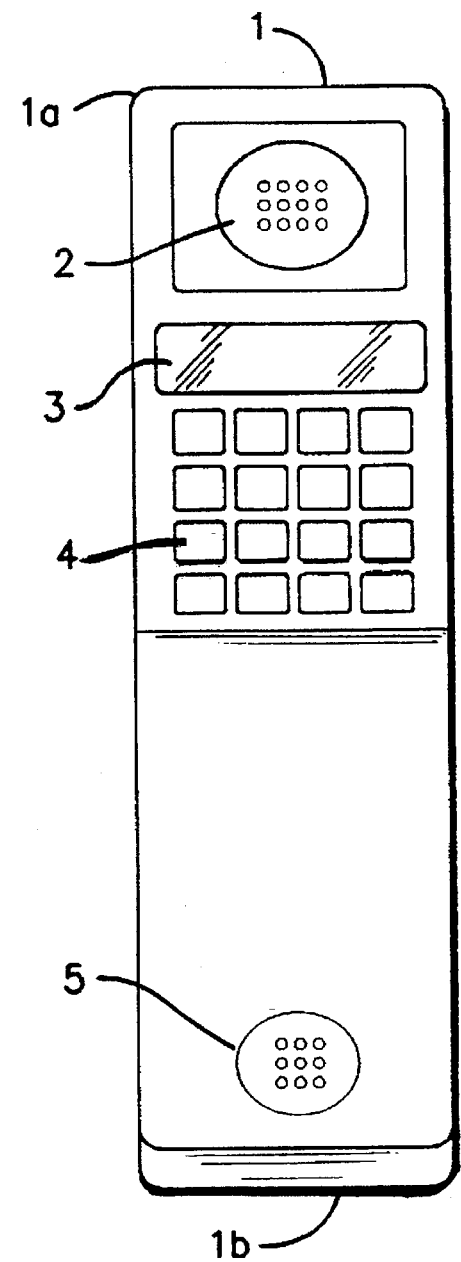
FIG. 5C
FIG. 5B
FIG. 5A

FOLDABLE PORTABLE TELEPHONE WITH IMPROVED ANTENNA GAIN

This application is a continuation of application Ser. No. 08/356,674, filed Dec. 15, 1994, now abandoned.

BACKGROUND OF THE INVENTION

The present invention relates to a portable radio communication apparatus and, more particularly, to a foldable portable telephone having an improved antenna gain and operability.

A portable telephone of the type described usually has an upper casing, lower casing, and antenna. The problem with this kind of telephone is that the antenna is close to the user's ear since it protrudes from the top of the telephone, as will be described later specifically. In this condition, the antenna gain is lowered due to the influence of the user's body. Another problem is that the telephone cannot be brought into an off-hook state in interlocked relation to the movement of the lower casing away from the upper casing. Specifically, in the event of a conversation, the user has to open the lower casing away from the upper casing and then set up the off-hook state.

SUMMARY OF THE INVENTION

It is, therefore, an object of the present invention to provide a foldable portable telephone which reduces the influence of the user's body on an antenna and goes off-hook automatically when a casing thereof is unfolded.

A foldable portable telephone of the present invention is made up of an upper casing having a receiver portion, and a lower casing having a transmitter portion. The lower casing is rotatably connected to the upper casing by a hinge. When the lower casing is rotated away from the upper casing, the receiver portion is moved to protrude from the upper casing. At this instant, the telephone is brought to an off-hook state. When the lower casing is rotated onto the upper casing, the receiver portion is retracted into the upper casing while the telephone is brought to an on-hook state. The receiver portion, when protruded from the upper casing, increases the distance between an antenna and the user's ear. In this condition, the antenna is not influenced by the user's body and, therefore, maintains a sufficient antenna gain. In addition, since the telephone goes off-hook automatically when the casing is unfolded, the user is free from troublesome manipulation.

BRIEF DESCRIPTION OF THE DRAWINGS

The above and other objects, features and advantages of the present invention will become more apparent from the following detailed description taken with the accompanying drawings in which:

FIGS. 2A is a plan view of a foldable portable telephone embodying the present invention;

FIGS. 2B and 2C are side elevations showing the embodiment in an unfolded position and a folded position, respectively;

FIG. 4A is a plan view showing a second embodiment of the present invention;

FIGS. 4B and 4C are side elevations showing the second embodiment in an unfolded position and a folded position, respectively;

FIG. 5A is a plan view of a third embodiment of the present invention;

FIGS. 5B and 5C are side elevations showing the third embodiment in an unfolded position and a folded position, respectively;

In the figures, the same or similar constituent parts are designated by the same reference numerals.

DETAILED DESCRIPTION OF THE PREFERRED EMBODIMENTS

Figure 1:
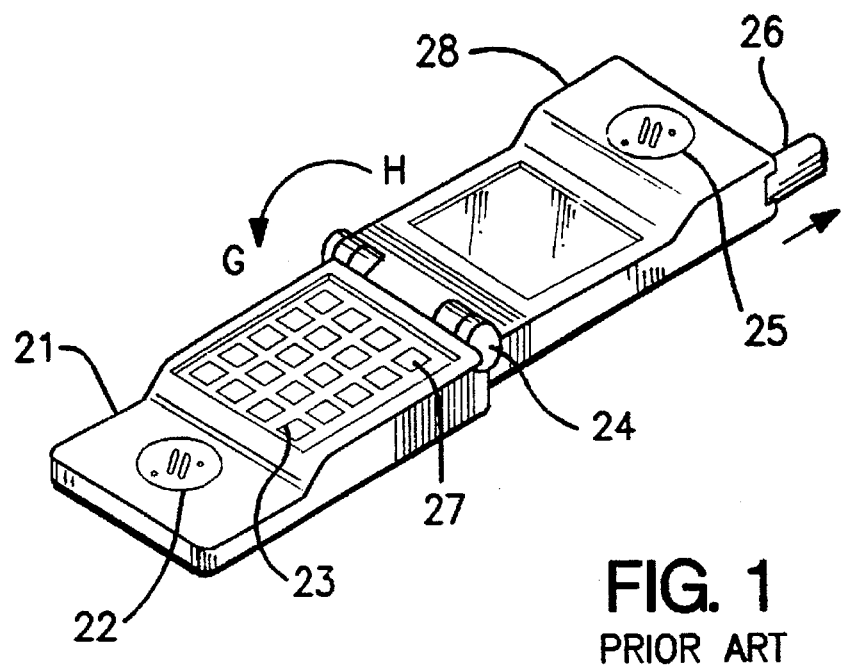
FIG. 1 is a perspective view of a conventional foldable portable telephone.

To better understand the present invention, a brief reference will be made to a conventional foldable portable telephone, shown in FIG. 1. As shown, the telephone has a first casing 28 and a second casing 21. A transmitter portion 22, having a microphone thereinside, and keys 23 are arranged on the second casing 21. The first casing 28 is rotatably connected to the second casing 21 by a hinge 24. A receiver portion 25, having a speaker thereinside, is included in the first casing 28. To fold the telephone, the casing 28 is rotated about the hinge 24 from a position H to a position G until the former contacts the latter, as indicated by an arrow in the figure. In such a folded position, the telephone is easy to carry. Conversely, to unfold the telephone, the casing 28 is rotated from the position G to the position H so as to locate the receiver portion 25 at the upper portion of the entire telephone. Subsequently, an antenna 26 is extended from the casing 28, and then a power key 27 is pressed. In this condition, the telephone allows a conversation to be held thereon.

However, the conventional telephone having the above configuration suffers from a decrease in antenna gain due to the user's body and is troublesome to operate, as discussed earlier.

Referring to FIGS. 2A–2C, a first embodiment the foldable portable telephone in accordance with the present invention will be described. As shown, the telephone has a casing 1 made up of an upper casing 1a and a lower casing 1b. A receiver portion 2, a display 3 and keys 4 are provided on the upper casing 1a while a transmitter portion 5 is provided on the lower casing 1b. The lower casing 1b is rotatably connected to the lower end of the upper casing 1a by a hinge 1c. Magnets 10 and 11 are respectively built in the casings 1a and 1b, so that the casings 1a and 1b in a folded position will not be unfolded by accident. To unfold the casings 1a and 1b, a switch, not shown, is operated to cause the magnets 10 and 11 to slide. In the illustrative embodiment, the casings 1a and 1b are held in a folded position by magnets of opposite polarities; when the magnets are displaced, the casings 1a and 1b are unfolded due to repulsion acting between the same polarities. When the casings 1a and 1b are unfolded, the receiver portion 2 protrudes from the casing 1a automatically, as shown in FIG. 2B. Conversely, the receiver portion 2 is retracted into the casing 1a when the casings 1a and 1b are folded. A mechanism for so moving the receiver portion 2 is disposed in the receiver portion 2. As shown in FIG. 2A, receiver portion 2 comprises an earpiece having openings to facilitate passage of sound to the user's ear.

Figure 3:
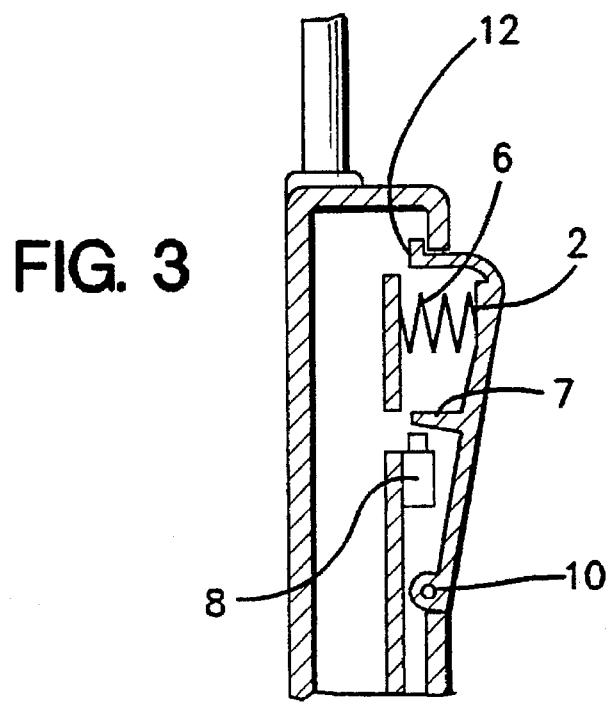
FIG. 3 is a section of a receiver portion included in the embodiment.

Specifically, as shown in FIG. 3, the receiver portion 2 is rotatably connected at one end thereof to the upper casing 1a by a pin 10. A flat actuator 7 extends out from the intermediate portion of the receiver portion 2 for selectively turning on or turning off a hook switch 8, as will be described later. The other end of the receiver portion 2 is implemented as a stop 12 which limits the movement of the receiver portion 2. The receiver portion 2 is constantly biased by a spring 2 in the direction in which it protrudes from the casing 1a.

In operation, assume that the lower casing 1b is rotated from a folded position shown in FIG. 2C to an unfolded position shown in FIG. 2B, as indicated by an arrow B in the FIG. 2B. Then, the receiver portion 2 rotates about the pin 10 due to the action of the spring 6 until it protrudes from the upper casing 1a. As a result, the actuator 7, pressing the hook switch 8, is released from the switch 8. The hook switch 8 holds the telephone in an on-hook state when pressed by the actuator 7 or brings it into an off-hook state when released from the actuator 7. Hence, in the position shown in FIG. 2B, the telephone allows the user to answer an incoming call or originate a call. In addition, the receiver portion 2, protruding from the upper casing 1a, increases the distance between an antenna 9 and the user's ear. In particular, as shown in FIG. 2B, an upper portion of receiver portion 2 projects from casing 1a farther than a lower portion thereof.

When the lower casing 1b is rotated from the unfolded position to the folded position, as indicated by an arrow A in FIG. 2B, it urges the receiver portion 2 into the upper casing 1a. As a result, the receiver portion 2 is rotated about the pin 10 until it has been fully retracted into the upper casing 1a. At the same time, the actuator 8 presses the hook switch 8 so as to bring it into an on-hook state. The two casings 1a and 1b are held in the folded position due to the magnets 10 and 11 which attract each other.

In the illustrative embodiment, the transmitter portion 5 may be provided on the upper casing 1a, if desired.

FIGS. 4A–4C show a second embodiment of the present invention. As shown, this embodiment is essentially similar to the previous embodiment except that the keys 4 are provided on the lower casing 1b and that the upper casing 1 is opened from a position C to a position D, FIG. 4B.

Referring to FIGS. 5A–5C, a third embodiment of the present invention is shown. As shown, the casing 1 is also made up of the upper casing having the receiver portion 2, display 3 and keys 4, and the lower casing 1b having the transmitter portion 5. In this embodiment, the lower casing 1b is slidably connected to an accommodating portion 1d included in the upper casing 1.a. Assume that the lower casing 1b is slid from a position shown in FIG. 5C to a position shown in FIG. 5B, as indicated by an arrow F. Then, the receiver portion 2 protrudes from the upper casing 1a about the pin 10 under the action of the spring 6, as described with reference to FIG. 3. As a result, the actuator 7 is released from the switch 8 to set up an off-hook state. Again, the receiver portion 2, protruding from the upper casing 1a, increases the distance between the user's ear and the antenna 9 in the event of conversation. When the lower casing 1b is slid onto the accommodating portion 1d of the upper casing 1a in a direction E, it urges the receiver portion 2 into the casing 1a. Consequently, the receiver portion 2 is rotated about the pin 10 (FIG.3) and fully received in the upper casing 1a. At this time, the actuator 7 presses the switch 8 to set up an on-hook state.

Figure 6A:
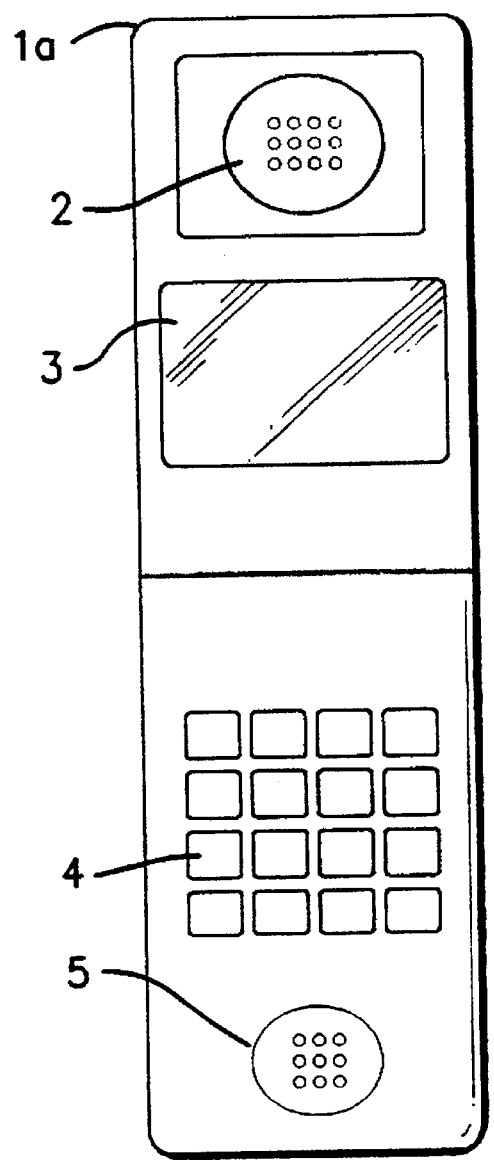
FIGS. 6A and 6B are plan views each showing a specific modification of the third embodiment.
Figure 6B:
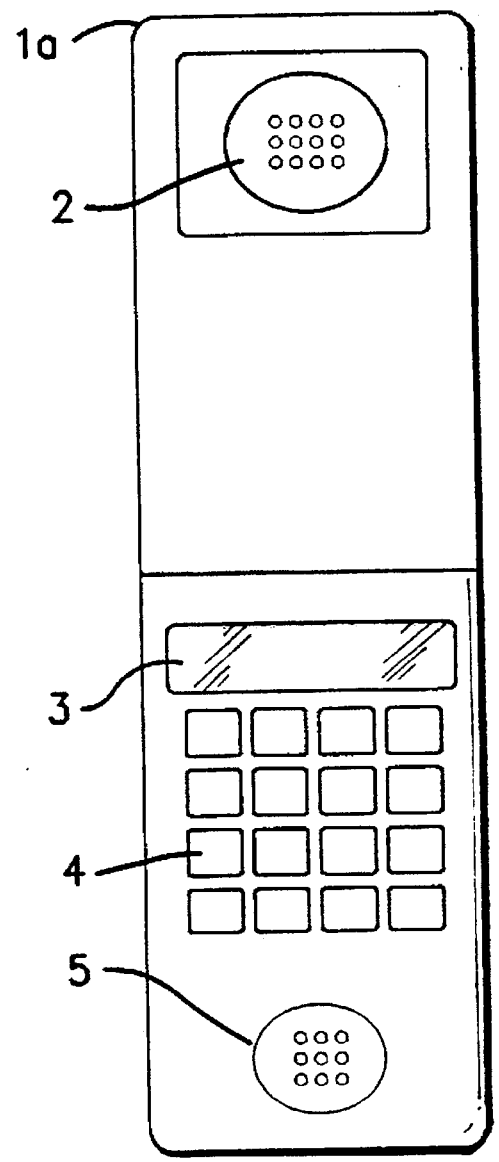

FIG. 6A shows a specific arrangement in which the display 3 and the keys 4 are respectively provided on the upper casing 1a and the lower casing 1b. FIG. 6B shows another specific arrangement in which both the display 3 and keys 4 are provided on the lower casing 1b. The transmitter 5 may be disposed in the upper casing 1a together with the receiver portion 2, if desired.

Figure 7:
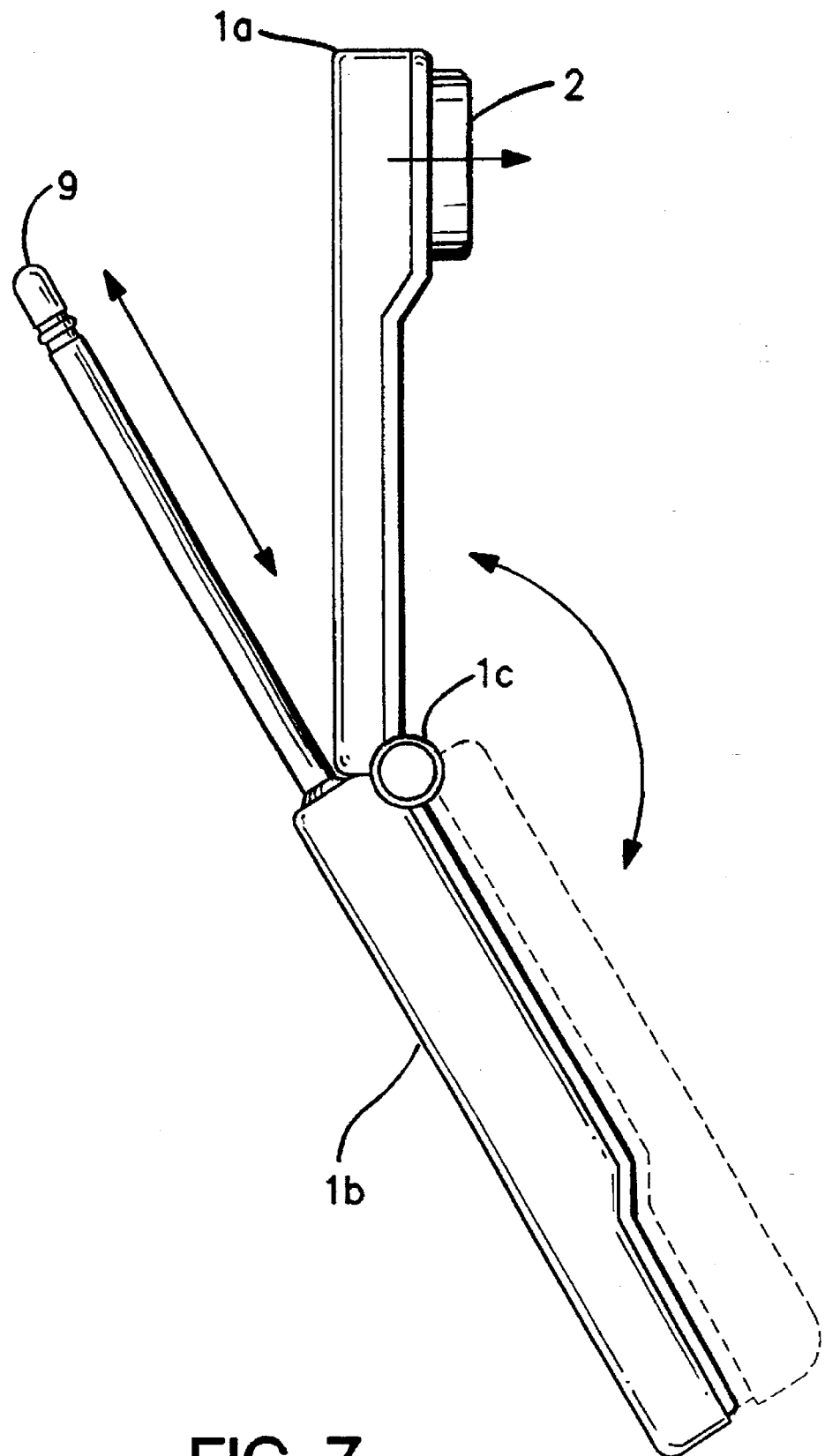
FIG. 7 is a side elevation showing a fourth embodiment of the present invention.

FIG. 7 shows a fourth embodiment of the present invention. In this embodiment, a supersonic motor or similar electric drive source is built in the telephone in order to move the receiver portion 2 into and out of the upper casing 1a, as indicated by an arrow in the figure. The telephone is foldable about the hinge 1c from a solid line position to a phantom line position, as also indicated by an arrow in the figure. In the illustrative embodiment, the antenna 9 is retractably mounted on the lower casing 1b.

Various modifications will become possible for those skilled in the art after receiving the teachings of the present disclosure without departing from the scope thereof.

What is claimed is:

1. A foldable portable telephone comprising:

a first casing having at least a receiver portion comprising an earpiece having means for facilitating passage of sound to a user's ear;

a second casing mounted on said first casing and movable toward and away from said first casing; and means for causing said receiver portion to protrude from said first casing when said first casing and said second casing are unfolded, such that an upper portion of said receiver portion projects from said first casing farther than a lower portion of said receiver portion, thereby to increase a spacing between a user's head and an antenna mounted adjacent said upper portion.

2. A telephone as claimed in claim 1, further comprising a hook switch which is actuated in interlocked relation to a protruding movement of said receiver portion.

3. A telephone as claimed in claim 1, wherein said first casing and said second casing are rotatably connected to each other by a hinge.

4. A telephone as claimed in claim 1, wherein said first casing and said second casing are extendible away from each other.

5. A telephone as claimed in claim 1, wherein said receiver portion comprises:

a body;

connecting means for rotatably connecting one end of said body to said first casing;

switch control means provided on said body for selectively turning on or turning off a hook switch of said telephone in response to a rotation of said body; and spring means provided on said body for causing said receiver portion to protrude from said first casing.

* * * * *